May 14, 1940.   G. W. KENNEDY   2,200,956
ICE CREAM CONE AND PROCESS OF MAKING
Filed March 14, 1939

INVENTOR.
GEORGE WINTER KENNEDY.
BY
ATTORNEY.

Patented May 14, 1940

2,200,956

UNITED STATES PATENT OFFICE 2,200,956

ICE CREAM CONE AND PROCESS OF MAKING

George Winter Kennedy, Philadelphia, Pa.

Application March 14, 1939, Serial No. 261,697

2 Claims. (Cl. 99—89)

This invention relates to edible containers or holders such as are employed in the commercial dispensing of ice cream and is concerned primarily with those holders known as ice cream cones.

The conventional ice cream cone is now made from a pastry composition, and while there has been proposed some modification of the pastry cone, as by combining other edible materials therewith, this art is still characterized by the cone that is essentially pastry in character.

The present invention takes cognizance of the fact that chocolate candy compositions may be combined with ice cream to form a pleasant and appetizing combination, and the invention has in view, as its foremost objective, the provision of an ice cream cone that is made from a chocolate candy composition.

More in detail the invention has in view, as an object, the provision of an ice cream cone made entirely from chocolate candy which is fashioned into the cone formation by molding operations.

Still another object of the invention is the provision of an ice cream cone that is made from a chocolate candy composition that has a body consistency permitting the same to be worked. When such a candy composition is employed, candy is first worked out into a flat sheet, after which a blank is stamped therefrom. This blank is then folded or rolled into the cone formation, with the edges of the seam that is formed placed together to maintain the formation. A cone made from a candy composition of this character will have better properties of toughness than will the molded cone which is of a more brittle nature.

Various other more detailed objects and advantages of the invention will in part become apparent, and in part be hereinafter stated, as the description of the invention proceeds.

The invention, therefore, comprises an ice cream cone that is made entirely from a chocolate candy composition. This cone may be either formed by molding, or by employing a chocolate candy composition having a body consistency that permits the same to be worked and folded into the cone shape.

Figure 1:
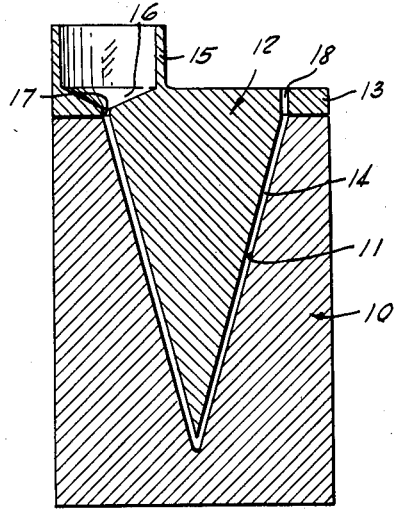

For a full and more complete understanding of the invention reference may be had to the following description and accompanying drawing, wherein:

Figure 1 is a sectional view through apparatus which may be employed in molding a chocolate candy ice cream cone.

Figure 2:
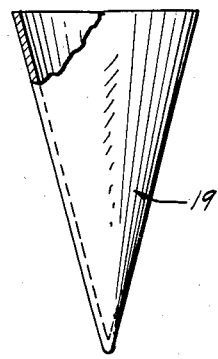
Figure 7:
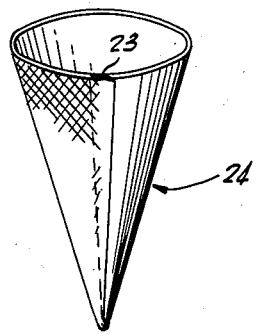
Figure 5:
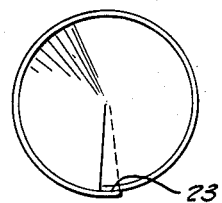
Figure 6:
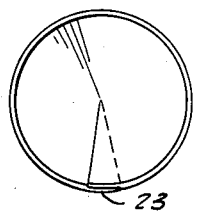
Figures 3, 4:
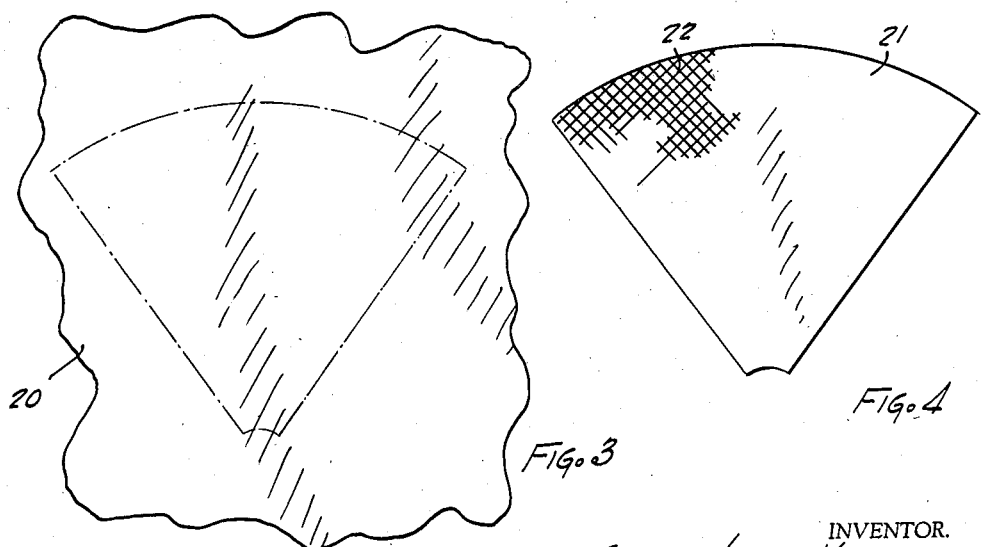

Figure 2 is a side elevational showing with parts broken away and shown in section, of an ice cream cone that is molded in the apparatus of Figure 1, Figure 3 is a plan view showing a flat sheet of candy composition prior to the stamping of a blank therefrom, Figure 4 is a view similar to Figure 3 of the blank after it is stamped, Figure 5 is a plan view after the blank of Figure 4 has been rolled into cone shape, Figure 6 is a plan view showing the seam edges after they are pressed together, and Figure 7 is a perspective view of the completed cone.

Referring now to the drawing, wherein like reference characters denote corresponding parts, and first more particularly to Figure 1, molding apparatus to form a chocolate ice cream cone is shown as comprising an outer mold part 10 that is formed with a conical recess 11. An inner mold part 12 carries a flange 13 that extends over the top of the outer mold part 10, so as to properly space the inner mold part 12 within the recess 11.

When the parts are spaced in the manner depicted in the drawing there is a thin space 14 provided which is designed to receive the chocolate candy composition. The inner mold part 12 also carries an inlet for the candy composition in the form of a cup 15 having a conically shaped bottom 16 terminating in an inlet opening 17, the latter communicating with the space 14.

As the chocolate is admitted to the space 14 through the inlet opening 17, it becomes necessary to provide for the exhaust of air in the space 14 as the latter is filled with the chocolate. Accordingly an air exhaust is shown at 18.

Chocolate candy compositions that may be molded into the required shape are well-known to the public, and many variations as to the exact make-up thereof may be had. Any desired composition is poured into the cup 15, from which it passes through the inlet opening 17 into the space 14. After the chocolate candy composition is hardened or set, the inner mold part 12 is removed, after which the cone itself may be removed. Such a cone is shown in Figure 2 and designated 19.

When a cone of greater toughness is required it becomes necessary to employ a candy composition having a body consistency which permits the same to be worked. The recipes for such candy compositions are also well-known to the public.

In making a cone from such a composition the candy is first worked out into a flat sheet, such as that designated 20 in Figure 3. A suitable stamp or cutter may then be employed to cut out the blank 21. Inasmuch as many ice cream cones carry fanciful designs on the exterior thereof, such a design may be provided by suitably engraving the stamping die. The design of cross-hatching is shown at 22 in Figure 4, but obviously any required design may be included.

The blank 21 is then rolled or folded into the cone formation shown in Figure 5 in which a seam is provided, as shown at 23. It will be noted that the edges of the seam overlap. In order to maintain the edges assembled to hold the cone formation the same may then be flattened out, as shown in Figure 6, to provide a smooth and uniform cone, and the required adhesion is afforded by the composition of the candy. A completed cone is made by this operation, as shown in Figure 6 and designated 24.

While preferred specific embodiments of the invention are hereinbefore set forth it is to be clearly understood that the invention is not to be limited to the exact constructions illustrated and described, because various modifications of these details may be provided in putting the invention into practice within the purview of the appended claims.

I claim:

1. A chocolate candy ice cream cone comprising a cone structure made from a pliable and workable candy composition, said cone structure having a seam consisting of overlapping edges pressed together to fuse the candy composition of said overlapping edges and establish a joinder therebetween.

2. A chocolate candy ice cream cone comprising a cone structure having a pointed end and open top and made from a pliable and workable candy composition, said cone structure including a seam consisting of overlapping marginal edges of substantially uniform breadth extending from said pointed end to said open top and pressed together to fuse the candy composition of said overlapping edges and establish a joinder therebetween.

GEORGE WINTER KENNEDY.